Sept. 21, 1937.  D. E. AUSTIN  2,093,860
VEHICLE WINDOW
Filed Feb. 17, 1936  2 Sheets-Sheet 1

Inventor
Dwight E. Austin
By Blackmore, Spencer & Fluck
Attorneys

Sept. 21, 1937.  D. E. AUSTIN  2,093,860
VEHICLE WINDOW
Filed Feb. 17, 1936  2 Sheets-Sheet 2

Inventor
Dwight E. Austin
By Blackmore, Spencer & Flint
Attorneys

Patented Sept. 21, 1937

2,093,860

UNITED STATES PATENT OFFICE 2,093,860

VEHICLE WINDOW

Dwight E. Austin, Pontiac, Mich., assignor, by mesne assignments, to Yellow Truck and Coach Manufacturing Company, Pontiac, Mich., a corporation of Maine Application February 17, 1936, Serial No. 64,256

3 Claims. (Cl. 296—44)

This invention relates generally to mass transportation vehicles and more particularly to an improved window and ventilating sunshade structure for use on such vehicles.

In passenger buses the side walls include a series of vertically slidable windows mounted between spaced body posts and in some instances roll shades are associated with the window openings. Roll shades, usually being made of fabric, buckle, fray, and tear and need replacement from time to time. Their life is especially short during warm weather travel at high speed because the flexible curtains, if drawn with the windows open, flutter violently in the strong air currents. The wind action not only is harmful to the curtains, but is disturbing to the coach occupants.

It is an object of this invention to avoid the objections to the conventional shade and to provide an improved curtain having important and highly desirable advantages as to both manufacture and use. According to a preferred embodiment of the invention, the slidable blind comprises a single sheet metal stamping having opposite side margins slidably supported throughout their length by locating guides and having between the guide retained edges especially designed formations which stiffen the sheet transversely against buckling and also provide for the protected location of ventilating openings for the circulation of air without excessive draft or the entrance of dust and rain.

Figure 1:
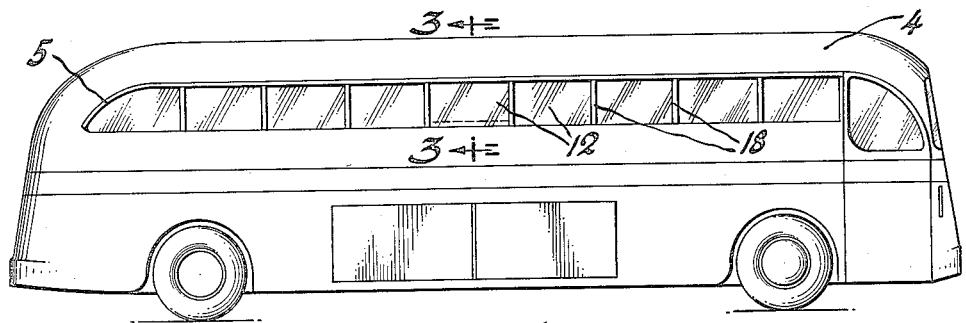
Figure 2:
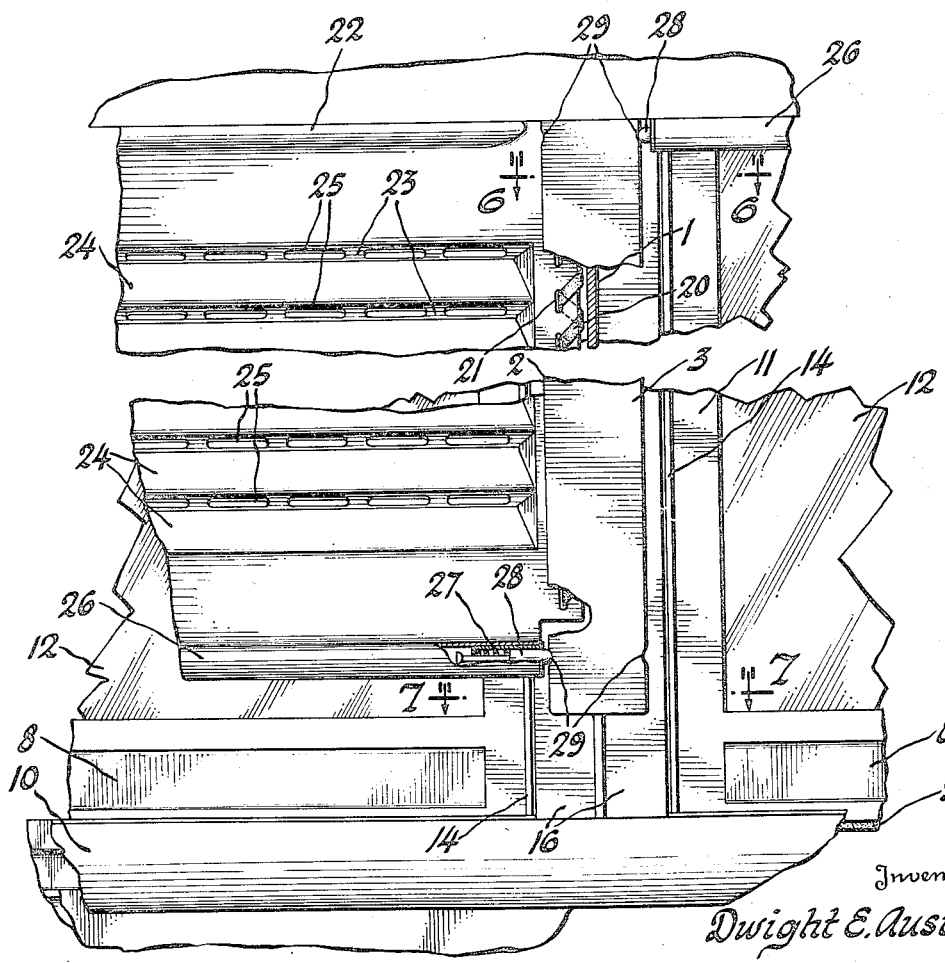
Figure 3:
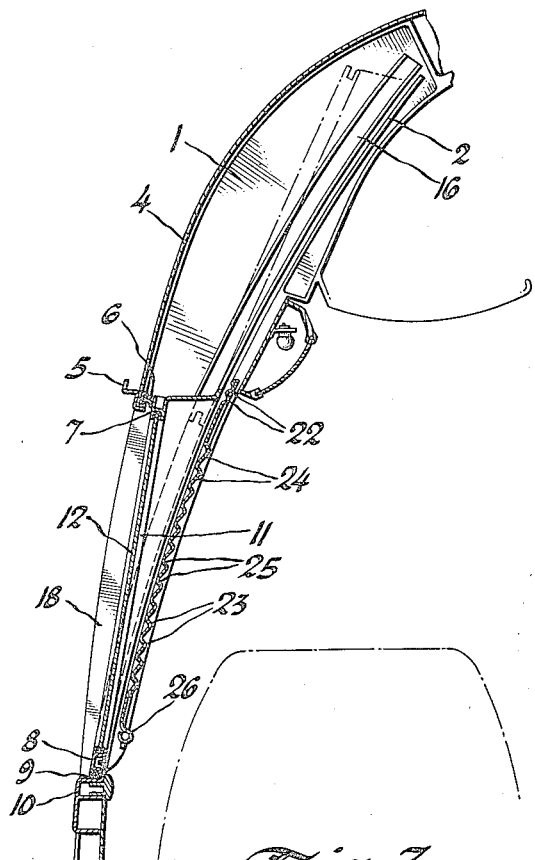
Figure 4:
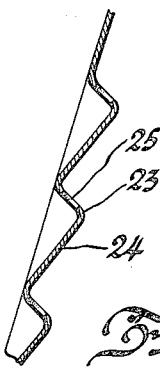
Figure 5:
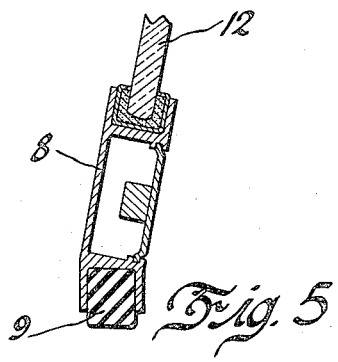

For a better understanding of the invention reference is made to the accompanying drawings wherein Figure 1 is a side elevation of a vehicle embodying the invention; Figure 2 is an elevation showing a fragment of a window post and its associated structure as viewed from the interior of the coach body; Figure 3 is a detail section taken on line 3—3 of Figure 1; Figure 4 is a vertical section of a portion of the window screen; Figure 5 is a detail sectional view of the lower sash rail of the window, and Figures 6 and 7 are sectional views taken on lines 6—6 and 7—7, respectively, of Figure 2.

The vehicle shown in the drawings is of a type in which the passenger seats are located on a flat floor extending along each side wall of the body and above the indented wheel housings with a centrally depressed aisle extending longitudinally of the vehicle from the loading platform at the front. The loading platform has a driver's station at one side and from the other side a step leads down to an entrance opening closed by a door in the vehicle side wall immediately forward of the front wheels. Behind the rear wheels and under the floor is the engine compartment and between the front and rear wheels and below the passenger compartment is a loading space for baggage or the like which is accessible through openings in the side walls closed by hinged doors. The side walls also include a longitudinal succession of windows arranged in the line of vision of seated bus passengers and separated one from another by vertical posts or body framing members which support the roof structure.

Figure 6:
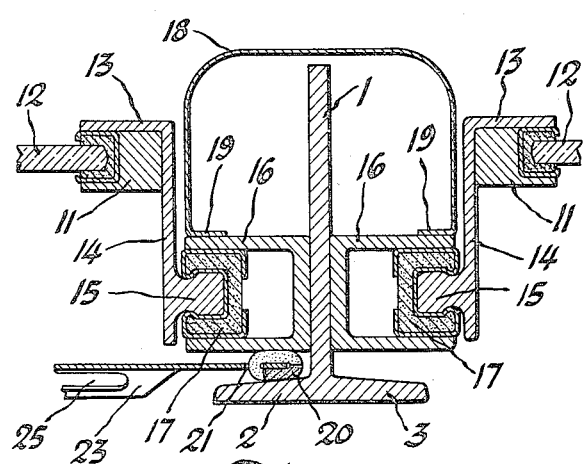
Figure 7:
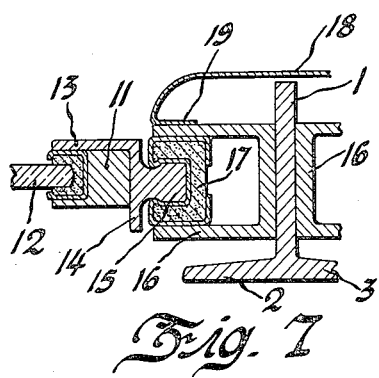

Each side wall pillar consists principally of a substantially T-sectioned metal rail including, as best seen in Figures 6 and 7, an outwardly extending web 1 and a pair of base flanges 2 and 3. The upper ends of the pillars curve inwardly as seen in Figure 3 and are joined at their upper ends to roof cross bows and the roof paneling may extend downwardly over the curved upper ends of the pillars to define at its lower edge, the top of the window opening.

Along its lower edge the upper curved corner panel 4 carries a drip rail or molding 5 on the outside and a flexible sealing flap 6 on the inside, adapted for engagement with the upper member 7 of the window sash. Sealing at the bottom window sash 8 is effected through the use of a rubber strip or weather seal 9 carried in a channel of the sash member 8 and engageable with the window sill 10 defining the bottom of the window opening and forming a part of the body side wall.

The side members of the window frame each include a shouldered strip 11 which provides a seat for an adjacent side edge of the window glass 12 in cooperation with a detachable strip 13. The strip 13 forms one leg of an angular plate, the other leg 14 of which projects inwardly and carries a lateral ridge or bead 15 extending from top to bottom of the window sash on a uniformly curved line. A similarly curved channeled guide member 16, carried by the window post, receives the rib 15 and provides a track therefor, by means of which the window may be raised or lowered. The raised position of the window is indicated by the dotted lines in Figure 3 and in that position the entire space between the drip rail 5 and sill 10 is open.

By preference the guides 16 have associated therewith the usual anti-rattle and sealing channels 17 to embrace the guide ridges 15. To enhance general appearance, a channeled molding 18 fits over and conceals the web 1 and may be provided with inturned mounting flanges 19 by which it can be welded or otherwise fastened to the window channels 16.

Throughout their length the window channels 16 are spaced a slight distance from the base flanges 2 and 3 and in cooperation with the flanges, provide a channeled track for slidably mounting a curtain interiorly of the window. The curtain is here shown as comprising a relatively simple and easily formed sheet metal panel which may be worked from relatively thin stock with suitable formations for stiffening the same and presenting a pleasing appearance. The opposite side margins of the panel to be guided and retained slidably in the space between the window guide 16 and the base flanges 2—3, are flat and continuous from end to end. In the interest of quietness, an anti-squeak web 20 may be laced through a succession of slots 21 in each flat marginal portion so as to extend between the openings on both sides and around the edge.

For stiffening the upper portion of the panel one or more beads or ribs 22 are pressed inwardly and extend in a transverse direction thereacross. Throughout its central portion, the panel is stiffened by a vertical succession of transverse troughs of V-shaped depressions, each comprising an upper and inwardly inclined wall 23 and a lower and outwardly inclined wall 24. The lower wall 24 is wider and lies at a smaller angle to the general plane of the panel than the wall 23, wherefor the exposed side of each trough consists principally of a downwardly and outwardly inclined band in stepped relation to corresponding portions in next succeeding depressions. This serves to shed water from one to the other in the event the vehicle is operated with the shade drawn and the window open in rainy weather so that there is little likelihood of water running down the inwardly inclined top wall 23.

For ventilation and the admission of light the top wall 23 of each trough is provided with a transverse succession of elongated slots 25. Since the inwardly inclined walls 23 extend at an angle to the horizontal, and because of the relation of the succeeding corrugations in the panel, wind currents are deflected and there is little likelihood of strong wind and dirt or water carried with it, being blown directly into the face of a bus passenger. Additionally the direct rays of the sun are shaded and yet sufficient light can enter the openings 25 to avoid darkness.

Along its lower edge the panel is curled upon itself as at 26, which not only reinforces the edge but also provides a convenient tubular hand portion through which the shade can be manipulated. At each end of the tubular portion 26 is fitted a thimble 27 for a spring pressed plunger or poppet 28 which is adapted to ride on the adjacent edge of the base flange 2—3 of the window post. In order that the shade may be securely locked in various positions of adjustment, the edge is notched at suitable points to afford depressed seats as shown at 29, into and out of which the poppets may snap when slid into or out of alinement therewith.

I claim:

1. A slidable window shade formed from a single panel of flat sheet metal and including, a transversely stiffened and vertically flexible central portion ending in spaced relation to the sides of the panel and having therein a vertical succession of trough-like formations, with air ventilation and light admission openings in the upper part of each formation and along the opposite sides beyond said formations, flat marginal portions to be received slidably within and flexed to conform to a pair of transversely spaced curved tracks and along the bottom a curled handle edge adapted to house a shade positioning poppet.

2. In combination, a pair of spaced body posts, each having a vertically curved guideway for a slidable sunshade, a sunshade fitted to said guideways and formed from a flat panel having vertically flexible flat margins at opposite sides to conform to the curved guideways, and beyond said flat margins transversely extending stiffening formations, including a curved bottom edge and a vertical succession of corrugations having ventilating openings therein, said curled bottom edge being adapted to contain outwardly acting poppets selectively engageable with spaced seats in the posts.

3. In a motor vehicle, a series of spaced body posts of T-section, each having its base flange of uniform curvature vertically and its web projected outwardly therefrom, a curved window guide secured to the web in spaced relation to the base flange, and a vertically flexible sunshade preformed of light gage flat sheet material having centrally thereof a succession of vertically spaced transverse corrugations for transverse stiffness and vertical curvature of the sheet in conformity to the curvature of the base flange and flat side margins to be curved and received slidably in the curved space between the base flange and said window guide.

DWIGHT E. AUSTIN.